United States Patent
Rockefeller

(10) Patent No.: US 10,418,139 B2
(45) Date of Patent: Sep. 17, 2019

(54) METHOD OF CLEANING NATURALLY OCCURRING RADIOACTIVE MATERIALS FROM FILTRATION SOCKS

(71) Applicant: Joe Richard Rockefeller, Glendive, MT (US)

(72) Inventor: Joe Richard Rockefeller, Glendive, MT (US)

( * ) Notice: Subject to any disclaimer, the term of this patent is extended or adjusted under 35 U.S.C. 154(b) by 1419 days.

(21) Appl. No.: 14/620,563

(22) Filed: Feb. 12, 2015

(65) Prior Publication Data

US 2019/0232341 A1    Aug. 1, 2019

Related U.S. Application Data

(60) Provisional application No. 61/981,036, filed on Apr. 17, 2014.

(51) Int. Cl.
| | |
|---|---|
| *G21F 9/00* | (2006.01) |
| *B01D 41/00* | (2006.01) |
| *G21F 9/30* | (2006.01) |
| *C02F 1/38* | (2006.01) |
| *G21F 9/28* | (2006.01) |
| *B01D 41/04* | (2006.01) |

(52) U.S. Cl.
CPC ............. *G21F 9/00* (2013.01); *B01D 41/00* (2013.01); *B01D 41/04* (2013.01); *C02F 1/38* (2013.01); *G21F 9/28* (2013.01); *G21F 9/30* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,207,532 A | * | 5/1993 | Mason | G21F 9/28 210/747.1 |
| 5,489,735 A | * | 2/1996 | D'Muhala | B09C 1/02 376/305 |

* cited by examiner

*Primary Examiner* — Erin F Bergner

(57) ABSTRACT

A method of cleaning naturally occurring radioactive materials (NORMs) from filtration socks utilizes a system that is equipped with a centrifuge, a disposal well, a surfactant and heated water. Through oil production, filtration socks become saturated with oil and NORMs. Typically, the used filtration socks are disposed of in a radioactive landfill or other proper disposal means. Through the method of cleaning NORMs, the used filtration socks are placed into a washing drum within a centrifuge and agitated with a surfactant and heated water to extract the NORMs from the used filtration socks. The centrifuge is spun to eject the waste solution from the washing drum, where the waste solution is pumped out of the centrifuge and into a class II disposal well to properly dispose the NORMs and brine from oil production processes. Cleaned filtration socks are then reusable or disposable in a more convenient manner.

10 Claims, 4 Drawing Sheets

METHOD OF CLEANING NATURALLY OCCURRING RADIOACTIVE MATERIALS FROM FILTRATION SOCKS

The current application claims a priority to the U.S. Provisional Patent application Ser. No. 61/981,036 filed on Apr. 17, 2014.

FIELD OF THE INVENTION

The present invention relates generally to disposal of waste products from oil and gas exploration and production. More specifically, the present invention is designed to clean oilfield filter socks using centrifugal force to separate oil and saltwater from Naturally Occurring Radioactive Materials, known to the oil industry as NORMs.

BACKGROUND OF THE INVENTION

The present invention resolves several issues. Liquid and solid wastes produced from oil and gas wells are processed at a salt water waste disposal site to separate oil, salt water and radioactive materials. In this process waste products are pumped through what is known as a "filter sock", a nylon mesh device which traps solids yet allows salt water, oil and other liquids to flow through for further treatment. Filter socks collect naturally occurring radioactive materials (NORMs) and other particulate matter, including hydrocarbons; hence the socks must be closely monitored and changed as needed.

The problem then arises with what to do with the engorged radioactive filter socks and their contents because disposal of these wastes is highly regulated. All states currently prohibit disposal of the filters in landfill sites because of the environmental hazards posed by NORMs, hydrocarbons and chemicals which may have been used in the different production processes. Some states, for example, North Dakota, prohibit disposal of used filter socks in their state altogether, thereby requiring oil production companies to transport contaminated filter socks to neighboring states that do allow proper disposal. Filter socks must be properly manifested before transport and cataloged in at the receiving facility where they will be stored ad infinitum. Any incident which compromises environmental safety during the transport or storage of the contaminated materials or actual compromise of the disposal site, releasing hazardous NORMs, chemicals, and/or crude oil could cause oil companies considerable financial liability for site cleanup and restoration.

The present invention, is specifically designed to alleviate several major areas of concern, i.e., to clean oilfield waste filtration socks expediently, to separate hazardous and potentially toxic substances from reclaimable hydrocarbons trapped within the filter, and to alleviate costs and risks associated with transport and storage of hazardous materials. Once the filtration socks have been cleaned they are able to be ground up into particles with size between 4 mm and 6.35 mm. The ground filtration socks can be mixed with a proprietary formula for lost circulation material which is used in the drilling process. In the drilling process, the particles within proprietary formula mixture are used to control the loss of drilling fluids from fractures in the earth. The particles fill the voids of the fractures preventing the loss of expensive drilling fluids due to different formations.

DETAIL DESCRIPTIONS OF THE INVENTION

All illustrations of the drawings are for the purpose of describing selected versions of the present invention and are not intended to limit the scope of the present invention.

Figure 1:
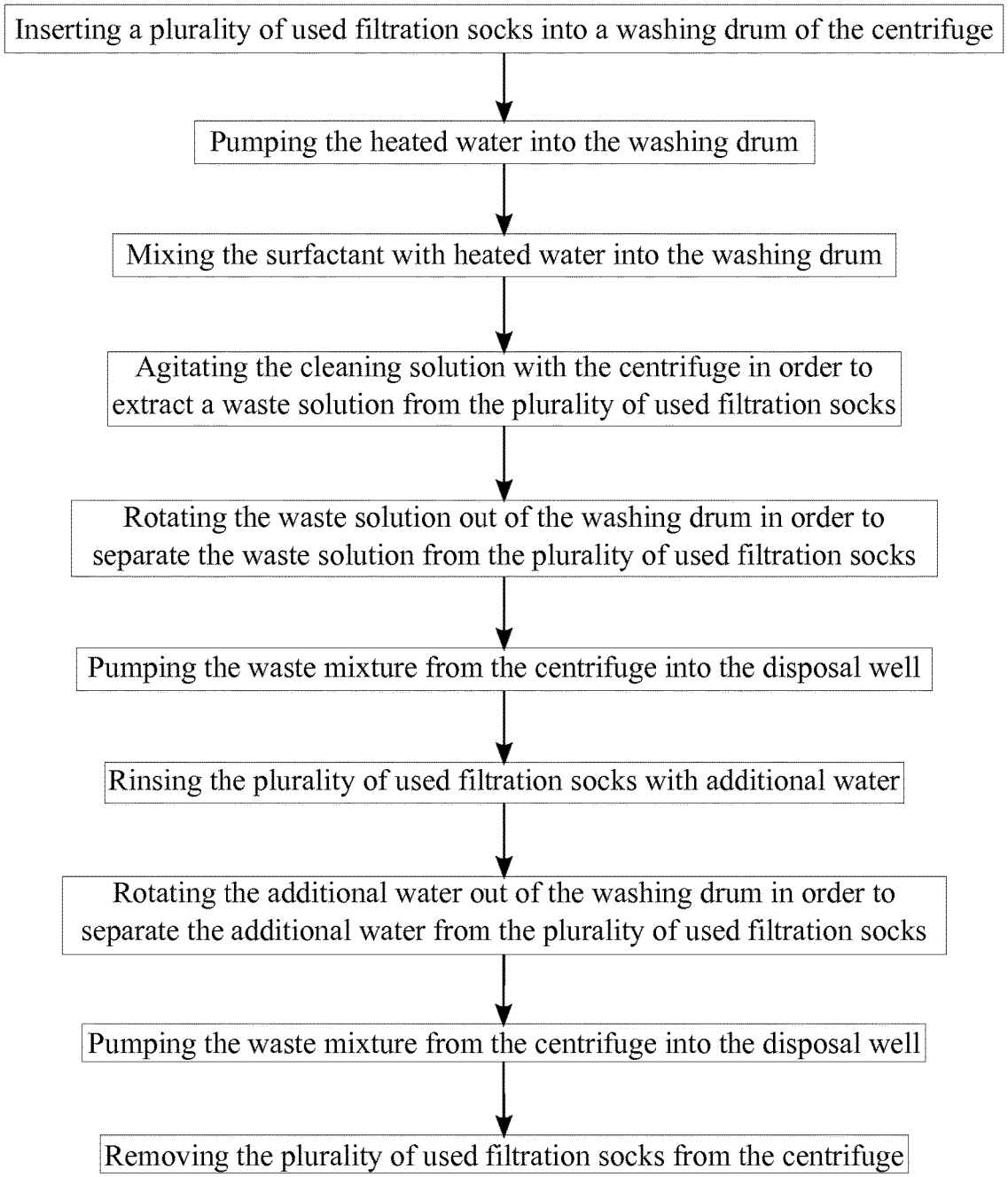
FIG. 1 is a block diagram of the method of the present invention.
Figure 2:
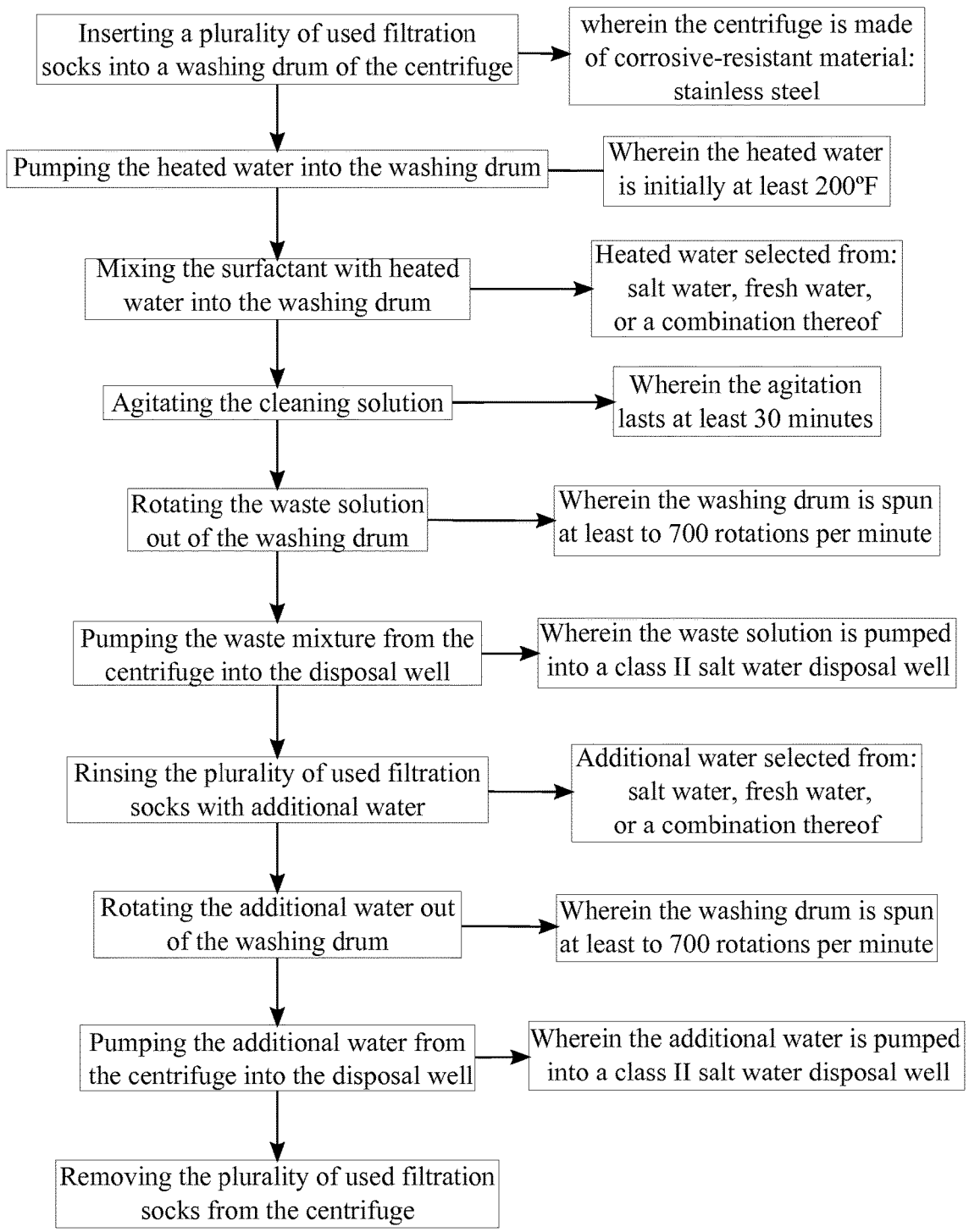
FIG. 2 is an exemplary centrifuge for use in the present invention.

In accordance to FIG. 1 and FIG. 2, the present invention is a method of cleaning naturally occurring radioactive materials (NORMs) from filtration socks. Filtration socks are used to separate NORMs and brine, a salt water solution, from oil during oil processing. While processing oil, filtration socks become radioactive such that they cannot be disposed of through conventional means and must be disposed in specific landfills or other adequate means of disposing of radioactive material. The present invention seeks to provide a method which allows radioactive filtration socks to be reusable or disposed more conveniently.

Figure 3:
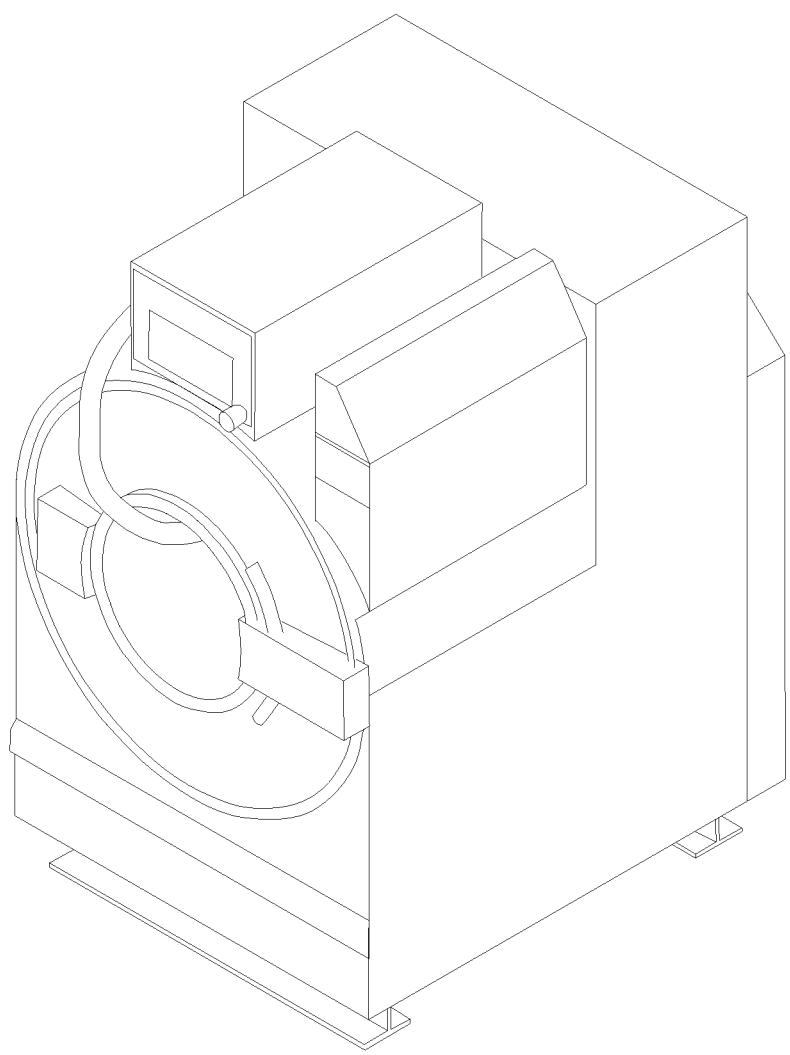
FIG. 3 is a schematic view of the progression of water through the present invention.
Figure 4:
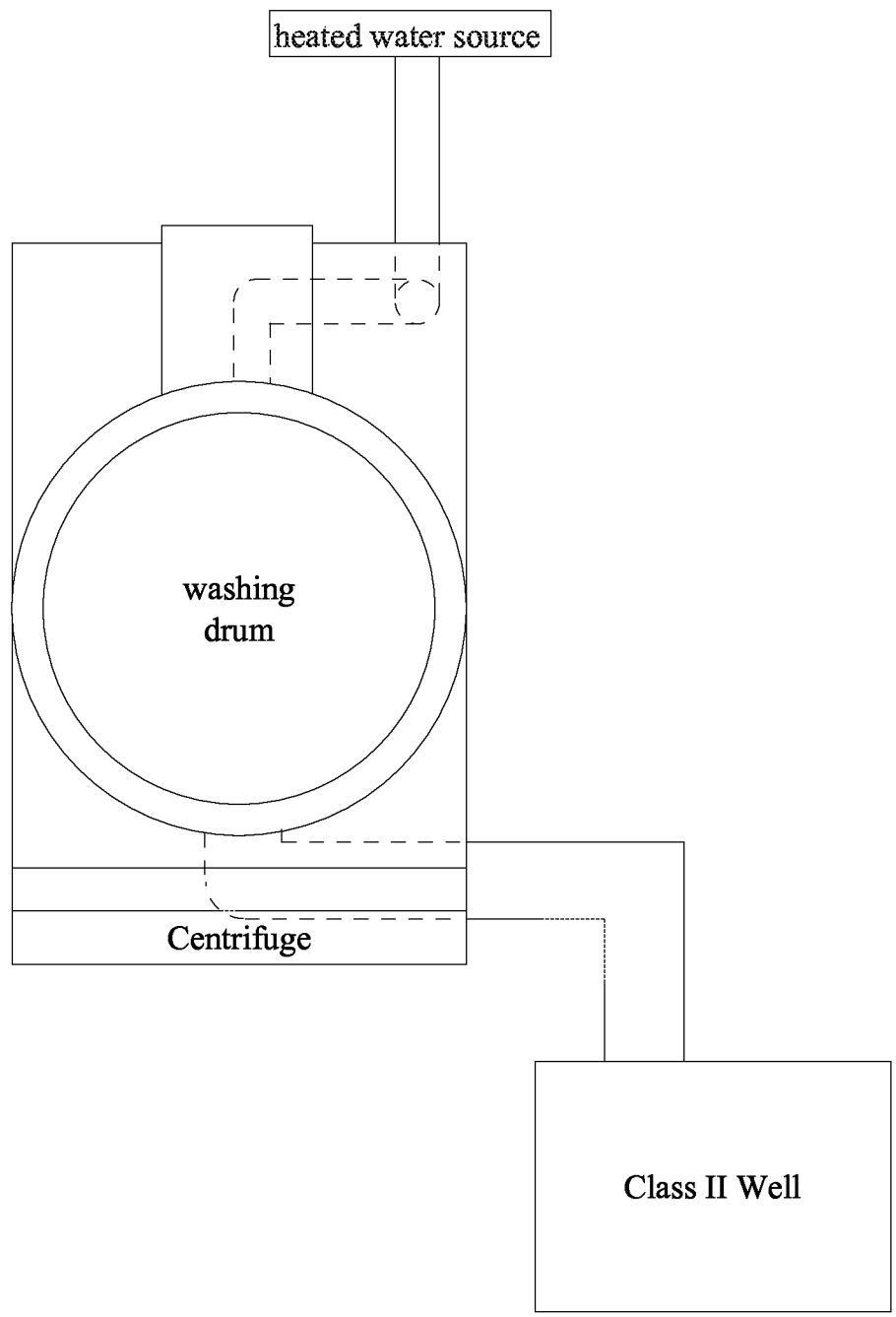
FIG. 4 is a block diagram detailing individual steps of the present invention.

In order to clean a plurality of used filtration socks, the present invention utilizes a centrifuge, a disposal well, a surfactant and heated water as system, in accordance to FIG. 4. The heated water source is in fluid communication with the centrifuge such that the heated water can flow from the heated water source to the centrifuge. The heated water is heated to have a temperature of at least 200° F. to assist in separation of NORMs from the filtration socks. The surfactant is manually added to a washing drum of the centrifuge. The surfactant is a select proprietary solution which removes oils from saturated clothing. An exemplary centrifuge is shown in FIG. 3 as the plurality of filtration socks can be placed within the washing drum. The centrifuge is in fluid communication with the disposal well, such that the extracted NORMs and other waste fluids can flow from the centrifuge to the disposal well.

Initially, the plurality of used filtration socks is inserted into the washing drum of the centrifuge and the heated water is heated to 200° F. The washing drum includes perforations which allow the wash fluids and NORMs to be separated from the plurality of used filtration socks. Once the plurality of socks has been inserted into the washing drum, heated water is pumped into the washing drum. Subsequently, the surfactant is mixed with the heated water into the washing drum, wherein the plurality of used filtration socks is submerged within a cleaning solution containing the heated water and the surfactant.

NORMs are extracted from the used filtration sock by agitating the plurality of used filter socks and the cleaning solution with the centrifuge in order to form a waste solution from the oil, NORMs, and the cleaning solution. The plurality of used filtration socks and the cleaning solution are agitated for at least thirty minutes, which allows sufficient time frame for the surfactant to react with the NORMs and brine deposited on the plurality of used filtration socks. Once the NORMs are extracted, the waste solution is separated from the plurality of used filtration socks by rotating the waste solution out of the washing drum, such that the waste solution is expelled through the perforations of the washing drum. After the waste solution is separated from the plurality of used filtration socks, the waste solution is pumped from the centrifuge into a disposal well. To ensure the plurality of used filtration socks has been cleaned, the plurality of used filtration socks is rinsed with additional water. The additional water is then separated from the plurality of used filtration socks by rotating the additional water out of the washing drum and then pumped into the disposal well. The washing drum is spun at least to 700 rpm to ensure the efficient removal of the waste solution and the additional water. Once the plurality of used filtration socks have been cleaned, the plurality of used filtration socks are removed from the centrifuge.

Brine and potentially some NORMs as well are corrosive to certain types of metals. Therefore, the centrifuge is made of a corrosive-resistant material, preferably stainless steel. While stainless steel is preferred, the centrifuge can be made from any other material which provides the corrosive resistant properties to brine and NORMs. Stainless steel is well known for its corrosive resistant nature as well as the strength to withstand various forms of abuse.

The disposal well is preferred to be a class II well, as shown in FIG. 2 and FIG. 4. A class II wells are associated with oil and natural gas production. Class II wells prevent the disposal of brine and oil into surface water bodies and protect surface contamination of soil and water to keep drinking water clean for distribution. Through this process the waste disposal can be preformed onsite, alleviating the need for long distance transport of HAZMAT materials and long term storage.

Due to the capabilities of the class II well, the heated water and the additional water of the present invention is able to be selected from a group consisting of fresh water, salt water, or a combination thereof. Thus, allowing brine which has been separated from the oil during oil production or fresh water to be used. The use of brine lowers costs associated with transporting or distilling fresh water liquid to the oil processing site. Separated oils recovered during this process may be sold on the market.

Although the invention has been explained in relation to its preferred embodiment, it is to be understood that many other possible modifications and variations can be made without departing from the spirit and scope of the invention as hereinafter claimed.

What is claimed is:

1. A method of cleaning naturally occurring radioactive materials from filtration socks comprises the steps of: providing a centrifuge, a disposal well, a surfactant, and heated water; inserting a plurality of used filtration socks into a washing drum of the centrifuge; pumping the heated water into the washing drum; mixing the surfactant with the heated water into the washing drum, wherein the plurality of used filtration socks are submerged within a cleaning solution containing the heated water and the surfactant; agitating the cleaning solution with the centrifuge in order to extract a waste solution from the plurality of used filtration socks, wherein the waste solution contains naturally occurring radioactive materials (NORMS) and the cleaning solution; rotating the waste solution out of the washing drum in order to separate the waste solution from the plurality of used filtration socks; pumping the waste solution from the centrifuge into the disposal well; rinsing the plurality of used filtration socks with additional water; rotating the additional water out of the washing drum in order to separate the additional water from the plurality of used filtration socks; pumping the additional water from the centrifuge into the disposal well; and removing the plurality of used filtration socks from the centrifuge.

2. The method of cleaning naturally occurring radioactive materials from filtration socks as claimed in claim 1, wherein the heated water is initially at least 200° F.

3. The method of cleaning naturally occurring radioactive materials from filtration socks as claimed in claim 1, wherein the washing drum is spun at least to 700 rotations per minute during rotating the waste solution out of the washing drum and rotating the additional water out of the washing drum.

4. The method of cleaning naturally occurring radioactive materials from filtration socks as claimed in claim 1, wherein the waste solution is pumped into a class II salt water disposal well.

5. The method of cleaning naturally occurring radioactive materials (NORMs) from filtration socks as claimed in claim 1, wherein the additional water is pumped into a class II salt water disposal well.

6. The method of cleaning naturally occurring radioactive materials from filtration socks as claimed in claim 1, wherein the plurality of used filtration socks is agitated with the centrifuge for at least 30 minutes.

7. The method of cleaning naturally occurring radioactive materials from filtration socks as claimed in claim 1, wherein the centrifuge is made of corrosive-resistant material.

8. The method of cleaning naturally occurring radioactive materials from filtration socks as claimed in claim 7, wherein the corrosive-resistant material is stainless steel.

9. The method of cleaning naturally occurring radioactive materials from filtration socks as claimed in claim 1, wherein the heated water is a type of water selected from the group consisting of salt water, fresh water, and a combination thereof.

10. The method of cleaning naturally occurring radioactive materials from filtration socks as claimed in claim 1, wherein the additional water is a type of water selected from the group consisting of salt water, fresh water, and a combination thereof.

* * * * *